United States Patent [19]

McAllister

[11] Patent Number: 4,617,633
[45] Date of Patent: Oct. 14, 1986

[54] DIRECT LIFT COMMAND BLENDING

[75] Inventor: Jack D. McAllister, Fort Worth, Tex.

[73] Assignee: The United States of America as represented by the Secretary of the Air Force, Washington, D.C.

[21] Appl. No.: 614,904

[22] Filed: May 29, 1984

[51] Int. Cl.$^4$ .............................................. B64C 15/00
[52] U.S. Cl. .................................. 364/434; 244/181; 318/584
[58] Field of Search ............... 364/424, 427, 434, 435, 364/433; 244/192, 193, 181, 76, 213–217; 318/584

[56] References Cited

U.S. PATENT DOCUMENTS

| | | | |
|---|---|---|---|
| 3,945,593 | 3/1976 | Schänzer | 364/434 |
| 4,093,158 | 6/1978 | Clews et al. | 244/182 |
| 4,093,159 | 6/1978 | Gilson | 244/187 |
| 4,261,537 | 4/1981 | Tisdale et al. | 244/181 |
| 4,326,253 | 4/1982 | Cooper et al. | 364/435 |

Primary Examiner—Errol A. Krass
Assistant Examiner—Thomas G. Black
Attorney, Agent, or Firm—Donald J. Singer; Willard R. Matthews; William G. Auton

[57] ABSTRACT

The rapid and precise control of an aircraft flight path is obtained by a continuous blending of direct lift and conventional longitudinal control system commands by a unit that consists of a combination of a linear gradient and breakout element, a blending integrator, a nonlinear element, a Direct Lift Limit element, an interconnect gain element, and three summing junctions. Direct lift is blended with conventional control as the pilot manual command is conditioned by the linear gradient and breakout element to provide the command signal to the first summing junction. The difference between this command and the output of the blending integrator is applied to the recentering nonlinear element. The direct lift command is obtained by passing the output of the recentering nonlinear element through the direct lift limit element. The second summing junction is used to reform the total system command which is applied to the third summing junction. The conventional longitudinal command is the output of the third summing junction; this output being the difference between the total system command and the direct lift command as modified by the interconnect gain.

5 Claims, 6 Drawing Figures

DIRECT LIFT COMMAND BLENDING

STATEMENT OF GOVERNMENT INTEREST

The invention described herein may be manufactured and used by or for the Government for governmental purposes without the payment of any royalty thereon.

BACKGROUND OF THE INVENTION

The present invention relates to aircraft control systems and specifically to a flight control system which automatically commands a unique blend of direct lift and conventional longitudinal control such that rapid and precise control of the aircraft flight path is obtained.

Military fighter aircraft, such as the F-16, have special demands imposed upon their control systems which are dictated by the particular combat missions they face.

This includes both the large-scale offensive and defensive air combat maneuvering and precision air-to-air tracking. The blending of longitudinal modes must enable the pilot to easily and effectively accomplish both of these distinctively different tasks with longitudinal control inputs via only the basic aircraft controls.

What is needed is a flight control system that will allow the pilot to use his conventional aircraft control instruments, but for aerial combat, the longitudinal control signals must result in precise flight path control, minimizing the change in aircraft angle of attack by either pilot maneuvering or atmospheric turbulence.

This task has been alleviated, to some degree, by prior art technique and devices that provide numerous aircraft control systems. The extent of these prior art devices is given by the following patents:

U.S. Pat. Nos. 4,093,158 issued on June 6, 1978 to Clews et al, 4,093,159 issued on June 6, 1978 to Gilson, 4,261,537 issued on Apr. 14, 1981 to Tisdale, Sr. et al, and 4,326,253 issued on Apr. 20, 1982 to Cooper et al.

The Clews patent discloses an aircraft control system ultilizing either a first signal which is a function of airspeed or a second signal which is a function of lift. However, the function of the control system is principally directed towards control of aircraft velocity, such that airspeed is maintained at pre-set values. In aerial combat the key objective is maintenance of precise air-to-air tracking, of which airspeed is a secondary factor. Other factors of weapon line stabilization include minimization of gust disturbance and stability of pitch axis angles, which are not addressed by the Clews patent.

The Gilson patent discloses an aircraft control system utilizing altixeter signals as well as lift signals. Like Clews, Gilson presents another partial solution to the present problem by designing a control system principally concerned with the aircraft angle of attack. As mentioned above, the pitch angle is but one concern in aerial combat and the Gilson device is principally a "stall avoidance" system for safety and is inadequate as an aerial combat control device.

The patent of Tisdale, Sr. et al discloses a control system which employs direct lift control with elevator control to control flight path angle. The Tisdale device is superior, for our purposes, to those of Clews and Gilson, in that it provides a means of controlling the flight path angle of aircraft with short term flight path stabilization against environmental disturbances. However, while the Tisdale device provides control of pitch attitude, it remains inadequate for our air-to-air tracking purposes in that it lacks adequate command of longitudinal control which is also needed for combat targeting.

Finally, the patent of Cooper et al discloses a flight control system containing angle of attack, altitude, acceleration, and lift signals. However, like Gilson, Cooper is principally of benefit for safety purposes since it generates a reference angle of attack as a function of vertical velocity such that stall conditions may be avoided and by optimizing an aircraft climb-out performance. The Cooper device is unsuited for our purposes.

In view of the foregoing discussion it is apparent that there currently exists a need for a flight control system that will minimize the effects of atmospheric turbulence and provide rapid and precise control of an aircraft flight path including stability of both pitch attitude and longitudinal control. The present invention is directed towards satisfying that need.

SUMMARY OF THE INVENTION

This invention provides a flight control system which automatically commands a unique blend of direct lift and conventional longitudinal control such that rapid and precise control of aircraft flight path is obtained. The system comprises the combination of a linear gradient and breakout element, a blending integrator, a non linear element, a direct lift limit element, an interconnect gain element, and three summing junctions.

The above elements of the invention function as follows:

the pilot manual command is conditioned by the linear gradient and breakout element to provide the command signal to the first summing junction. The difference between this command and the output of the blending integrator is applied to the recentering nonlinear element. The direct lift command is obtained by passing the output of the recentering nonlinear element through the direct lift limit element. The second summing junction is used to reform the total system command which is applied to the third summing junction. The conventional longitudinal command is the output of the third summing junction; this output being the difference between the total system command and the direct lift command as modified by the interconnect gain. For a pitch rate command, an air data gain is added to provide an equivalent Normal Acceleration Command for the blending device. In addition, a second air data gain is added to reconvert the output of summing junction to the proper valve for the pitch rate command.

It is a principal object of this invention to obtain rapid and precise control of an aircrafts flight path and pitch attitude using an automatic blending of the Direct Lift and conventional Longitudinal Control Modes, this blending being independent of aircraft response signals such as normal acceleration.

It is another object of the present invention to obtain a true and precise control of an aircraft longitudinal flight path.

A further object is to obtain a long term repositioning of the direct lift control surfaces to the aerodynamically most efficient deflection without altering the flight path angle.

These together with other objects features and advantages of the invention will become more readily apparent from the following detailed description when taken in conjunction with the accompanying drawing

DETAILED DESCRIPTION OF THE PREFERRED EMBODIENT

This invention provides a flight control system which automatically commands a unique blend of direct lift and conventional longitudinal control such that rapid and precise control of aircraft flight path is obtained.

In conventional aircraft operation, most turns performed have a tendency to induce a positive pitch in the aircraft attitude. However, in aerial combat, air-to-air tracking requires weapon line stabilization such that maneuvers must be made while minimizing the change in pitch angle. The implementation of this invention allows the pilot input into the aircraft controls to remain unchanged, since the automatic blending of direct lift with the longitudinal control signals will result in precise flight path control, minimizing the charge in aircraft pitch angle by either pilot maneuvering or atmoshperic turbulence.

Figure 1:
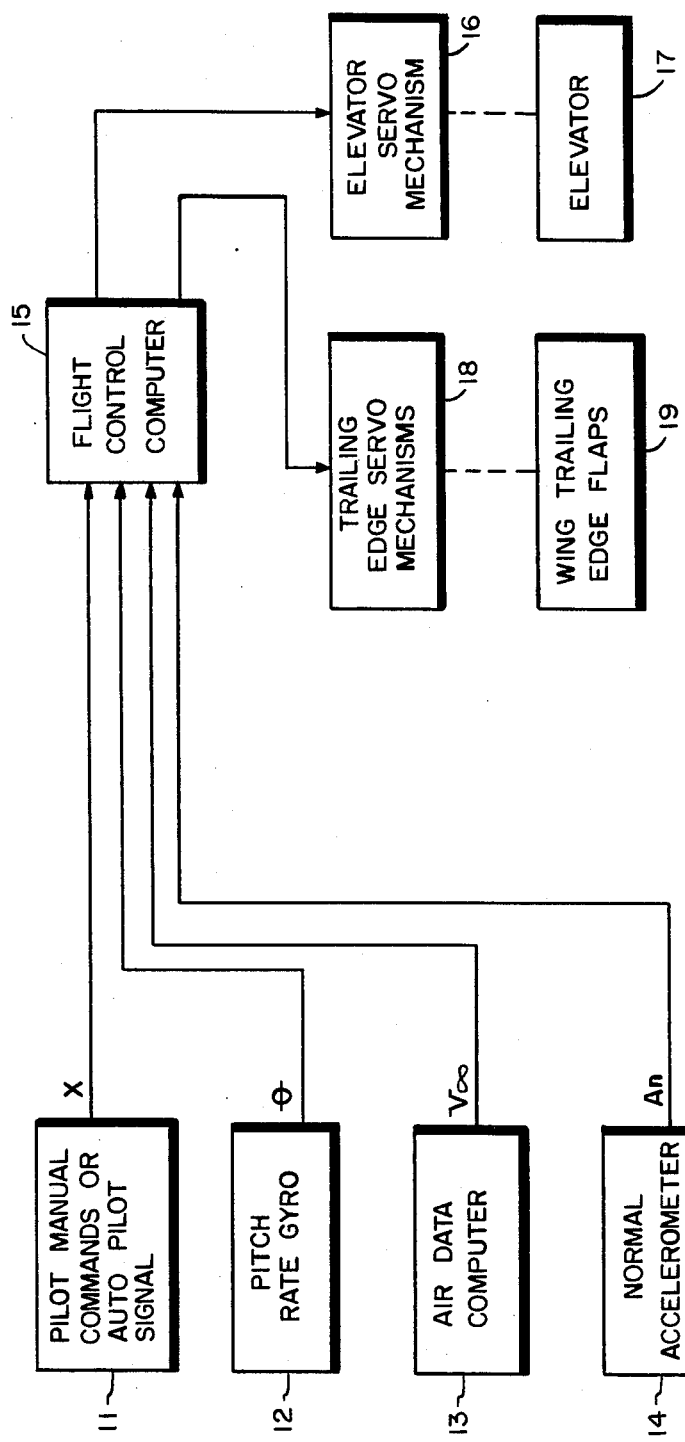
FIG. 1 is an illustration of a flight control system block diagram.

FIG. 1 is a block diagram of a conventional, prior art flight control system which is found on aircraft such as the F-16. The number 11 designates the source of the aircraft command signal X which is generated by either the autopilot or the aircraft manual control mechanisms.

Items 12 through 14 represent instrumentation on the aircraft that generate feedback control signals: a pitch rate gyro 12 generates a pitch rate signal $\theta$ an air data computer 13 generates an air velocity signal $V\infty$, and an accelerometer 14 generates the normal acceleration signal An. The pitch rate, air velcity, and normal acceleration signals are all applied to a flight control computer 15 which generates an elevator control signal and an aileron control signal. These elevator control and aileron control signals are applied to elevator power control units 16 to control the elevator 17 on the aircraft; and the wing trailing edge control signal is applied to the trailing edge control mechanisms 18 to control the wing trailing edge flaps 19. The present invention is a subset of the flight control computer depicted in FIG. 1 as item 15.

Figure 2:
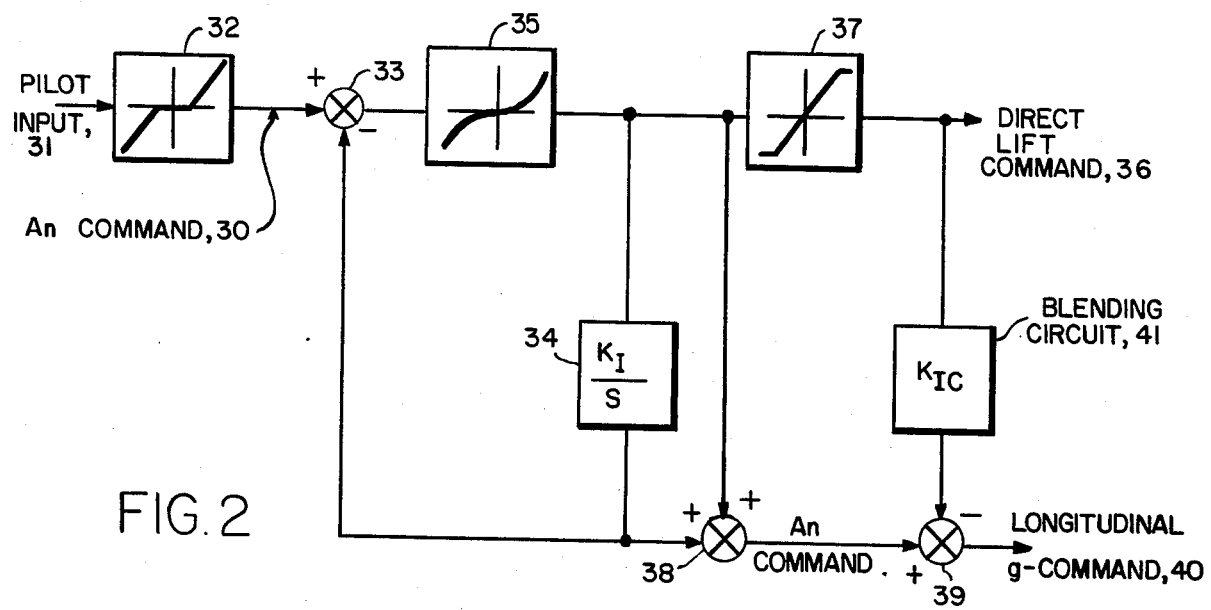
FIG. 2 is an illustration of one embodiment of the subject invention.

FIG. 2 is an illustration of one presently performed embodiment of the subject invention for flight control of aircraft with longitudinal g-command flight control systems. In order to automatically blend direct lift and longitudinal signals, the flight control system computer uses the combination of a linear gradient and breakout element, a blending integrator, a non linear element, a direct lift limit element, an interconnect gain element, and three summing junctions.

The above elements of the invention function as follows:

The pilot manual command 31 is conditioned by the linear gradient and breakout element 32 to provide the command signal to the first summing junction 33. The difference between this command and the output of the blending integrator 34 is applied to the recentering nonlinear element 35. The direct lift command 36 is obtained by passing the output of the recentering nonlinear element 35 through the direct lift limit element 37. The second summing junction 38 is used to reform the total system command which is applied to the third summing junction 39. The conventional longitudinal command 40 is the output of the third summing junction 39; this output being the difference between the total system command and the direct lift command 36 as modified by the interconnect gain 41. The interconnect gain 41 of FIG. 2 acts as a blending circuit to constrain the longitudinal command signal, which is received by the third summing junction 34, as a function of the direct lift command signal 36. This function is performed as follows: The interconnect gain 41 receives and amplifies the direct lift command signal 36 produced by the recentering nonlinear element 37, and outputs a modified direct lift command signal to the third summing junction 39. In the embodiment of FIG. 2, the value of $K_{IC}$ equals 0.75 and the result of such an input into the third summing junctin 39 serves to quicken the normal acceleration transient response.

Figure 3:
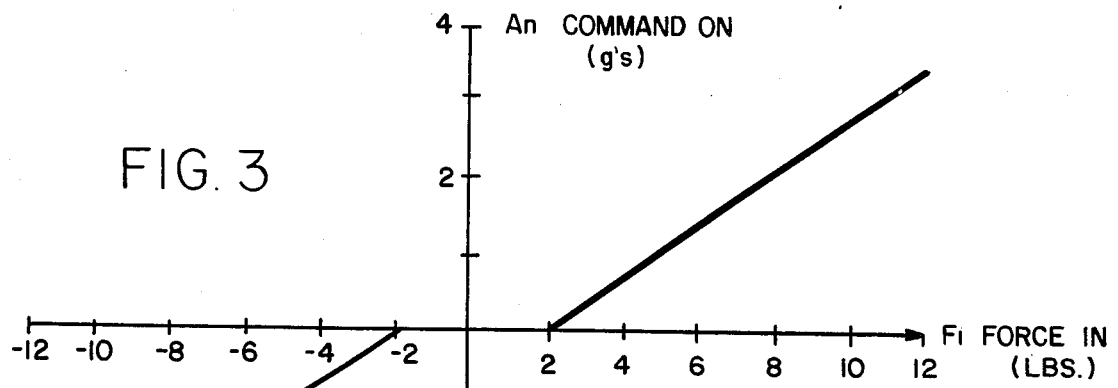
FIG. 3 is a sketch of the operating parameters of the linear gradient and breakout element.

FIG. 3 gives the operating parameters of the linear gradient and breakout element (item 32 of FIG. 2). The linear gradient and breakout element is an integrated circuit, known in the art, which conditions the pilot input to provide the command signal with a breakout point.

The function of the breakout point is to provide a safety feature on the aircraft controls in terms of a pressure threshold. If a pilot accidently bumps the sidestick controller, it is undesireable to have resultant flight control commands. Therefore the linear gradient and breakout element will not produce an output command signal for pressures on the manual controls of less than two pounds.

The horizontal axis represents the amount of force input to the sidestick controller. The vertical axis represents the output An command signal in terms of gravitational units, g's. As mentioned above, the output command will be zero for positive or negative pressures on the controls of less than 2 pounds. For positive input forces of greater than 2 pounds the output command $An = (Fi - 2)/3$ g's. For negative input forces less than 2 pounds the output command is $An = (Fi + 2)/3$ g's.

As discussed above, the pilot manual command, 31 of FIG. 2, is conditioned by the linear gradient and breakout element into the conditioned command signal 30 that enters the first summing junction 33.

The difference between the An command signal 30 and the output of the blending integrator 34, is generated by the summing junction 33 and applied to the recentering nonlinear element 35.

Figure 4:
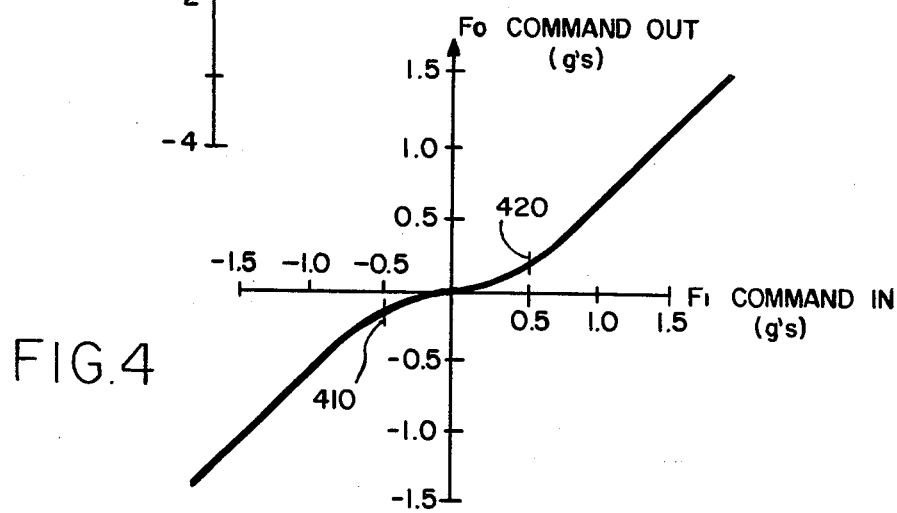
FIG. 4 is a sketch of the operating parameters of the recentering nonlinear element.

FIG. 4 is a sketch of the operating parameters of the recentering nonlinear element (item 35 of FIG. 2). The recentering nonlinear element performs the parabolic function depicted in FIG. 4 on the signal from the first summing junction (item 33 of FIG. 2). This parabolic function provides differences in system sensitivity in the direct lift command signal between conditions of large and small pilot manual command inputs.

This part of the system is referred to as the moving parabola function, because the integrator item 34 returns the command signal to the item 33 summing junction thereby driving the input signal for the parabola to zero. The nonlinearity in the system is composed of two parts: (1) the region centered on the origin to some arbitrary breakpoint is parabolic, and (2) a linear region for large input commands (behaves as if a small dead zone were present). For these large pilot inputs, the system is functioning in the linear region of the gradient. As the integrator value increases and approaches the final commanded value, the error signal "slides" back down into the more attentuated nonlinear region, and eventually the error is driven to zero. The integrator continues to drive the conventional system to the input value. A small pilot input at this point, which might typically be employed for precise tracking corrections, would result in nonlinearity response in the parabolic region, thereby obtaining the desired reduced control sensivity for fine tracking correctings. In contrast to the conventionally steep stick force gradient at higher load factors (large command changes for small changes in the command input), this approach has intuitive appeal for improving tracking performance. It should be noted that the above comments, concern themselves only with a command-in/command-out type representation, and do not address the actual aircraft response resulting from this command scheme.

Therefore, the horizontal axis of FIG. 4 represents the input command signal, Fi, and the vertical axis represents the corresponding output signal, Fo that is produced by the parabolic function. The parabolic portion of the curve is given by the equation $Fo = \text{constant} \times Fi |Fi|$ which occurs approximately within the breakpoints 410 and 420 where: $-0.5 < Fi < 0.5$.

The linear portion of the parabolic function occurs where $|Fo|$ breakpoint is given by the equation:

$(dFo/dFi) = 1$

At the actual breakpoint 410 and 420:

$Fo = \frac{1}{2} Fi$ and $(dFo/dFi) = 1$

The blending integrator, item 34 of FIG. 2, generates automatic direct lift command signals during the initial system transient response to pilot commands.

The blending integrator 34 is an integrated circuit performing the integrator function of the $K_I/S$ on the system command signal developing the resultant transit direct lift command signal to control the servo system automatically. In the integrator $K_I$ is the gain value and S is the Laplace operator of the integrator function.

In this particular embodiment which has been tailored to the F-16 flight control system, the key to obtaining optimum direct lift command blending was the use of a comparatively slow integrator rate (i.e., a value of 0.25 on the gain of $K_I$). For the direct lift command mechanization of FIG. 2 the integrator feedback is equivalent to $S/(S + K_I)$ washout on the direct lift/mode of command. Hence, a low value of the integration gain $K_I$ is necessary to allow time for conventional response build-up as the direct lift command is faded out.

Figure 5:
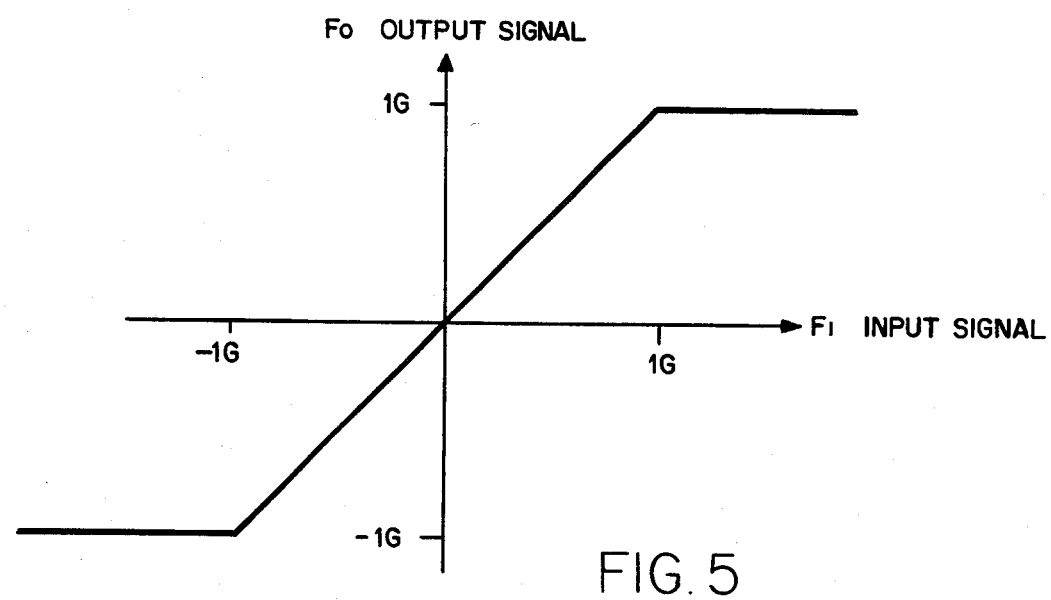
FIG. 5 is a sketch of the operating parameters of the direct lift limit element.

FIG. 5 is a sketch of the operating parameters of the direct lift limit element (item 37 of FIG. 2). The direct lift element produces the direct lift command signal 36 by limiting the signal produced by the recentering nonlinear element 35.

In FIG. 5, the horizontal axis represents the measure of the signal produced by the recentering nonlinear element in terms of an input direct lift command which is measured in g units. The vertical axis represents the measure of the output direct lift command produced by the direct lift element.

The curve in FIG. 5 is: $Fo = Fi$ for values of $-1 \text{ g} < Fi < 1 \text{ g}$ and $Fo = 1 \text{ g}$ for $Fi > 1 \text{ g}$.

The interconnect gain 41 (with a value less that unity) is used to quicken normal acceleration transient response by taking the direct lift command 36 generated by the direct lift limit element 37, providing a gain $K_{IC}$ equal to 0.75, and sending the resultant signal as an input to the third summing means 39.

The second summing junction (item 38 of FIG. 2) is used to reform the total system command by summing the output of the recentering nonlinear element 35 with the output of the blending integrator 34.

The conventional longitudinal command 40 is the output of the third summing junction 39; this output being the difference between the total system command produced by the second summing junction 38 and the direct lift command 36 as modified by the interconnect gain 41.

Figure 6:
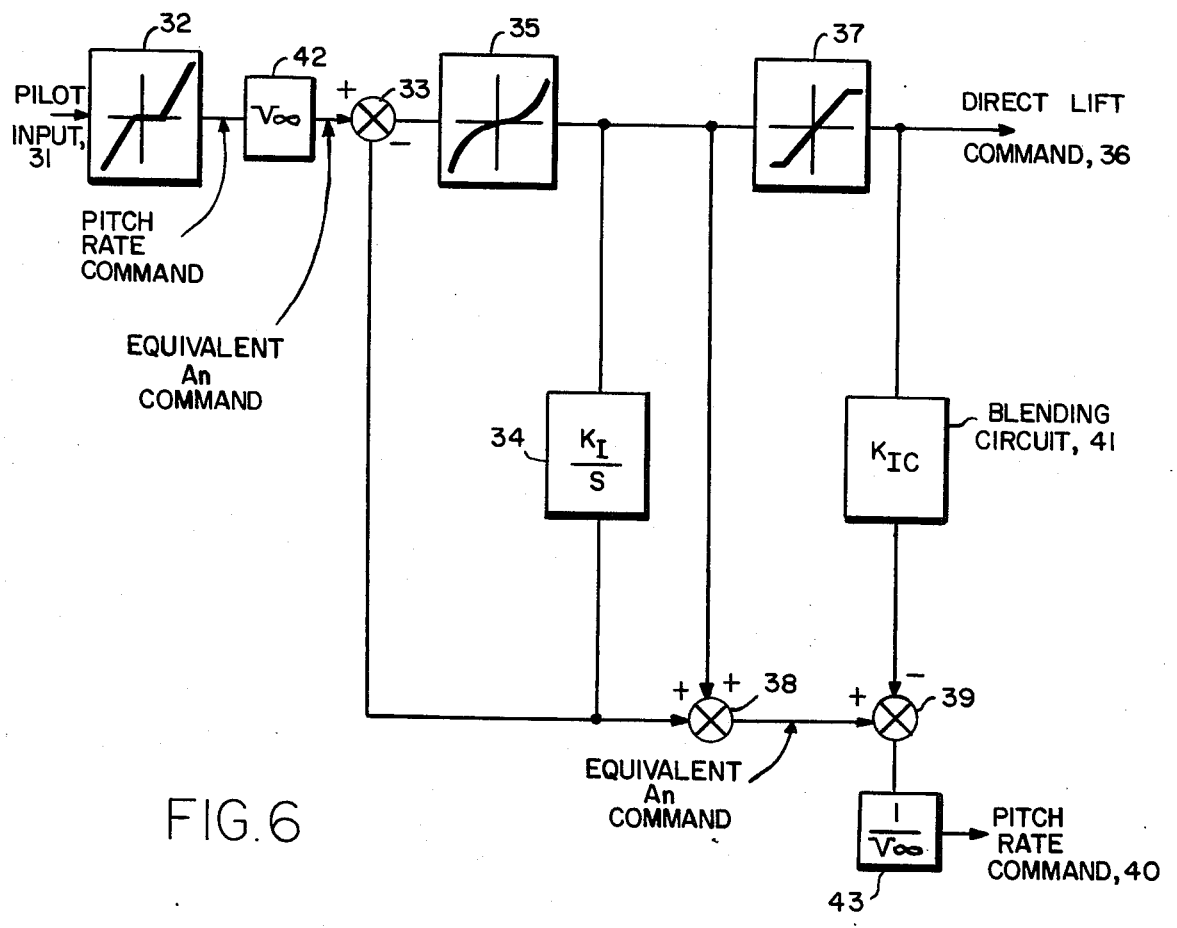
FIG. 6 is an illustration of another embodiment of the subject invention.

FIG. 6 is an illustration of another embodiment of the subject invention for use with aircraft having a pitch rate command flight control system. Elements 31 through 39 and 41 of FIG. 6 function identically as described above as elements 31 through 39 and 41 of FIG. 2. The linear gradient and breakout element 32 for use with the pitch rate command system will however have breakpoint and gradient values different from those shown in FIG. 3 which are applicable to a longitudinal g-command system.

For a pitch rate command, an air data gain 42 is added to provide an equivalent Normal Acceleration Command for the blending device 34. In addition, a second air data gain 43 is added to reconvert the output of summing junction 39 to the proper value for the pitch rate command 40.

In this particular embodiment the value of the first air data gain 42 is $V_\infty$ is the operating airspeed velocity of the aircraft. The value of $V_\infty$ is variable in this element and is continually modified as updated by the air data computer. Typical values for $V_\infty$ for the F-16 aircraft are $V_\infty = 1,000$ ft/second. The value of the second air data gain 40 is $1/V_\infty$ where $V_\infty$ is as described above.

One major advantage of direct lift command blending is enhanced capabilities for air-to-air offensive and defensive maneuvering. The present embodiment of the invention is installed directly into the flight control system of an aircraft such that the pilot continues to operate the existing aircraft controls in the conventional manner.

The direct lift command blending system has the following effects when used with the existing cockpit control stick of the aircraft.

1. Small fore and aft control stick inputs provide precise regulation of the aircraft flight path without altering angle-of-attack.

2. Large fore and aft control stick inputs provide the full maneuver capability as with a conventional control system but with the additional benefit of maneuvering quickening due to the automatic blending of direct lift with the conventional longitudinal control.

3. The automatic recentering feature assures that the aircraft control surfaces used for direct lift will be at the most efficient deflection of each stablized operating point and that pure direct lift control will be available for small command inputs about each operating point.

4. The pilot can simply and logically utilize both unconventional (direct lift) and conventional longitudinal control techniques with a single control stick without the complications of mode switching or adjusting of control mode blending/fading.

Another benefit of the present invention is attenuation of aircraft response due to random atmospheric turbulence, especially with respect to air-to-ground ordinance delivery tasks. One embodiment of the present invention obtained a measure of gust alleviation as a fall-out of a mechanization to achieve maneuver quickening in the longitudinal axis of the prototype F-16 flight control system.

The allowable loop gains (primarily the flap/g feedback) were constrained by closed loop stability margins with the critical case being 0.95 Mach number in the Sea Level to 15,000 ft altitude range.

By blending Direct Lift with conventional control, it is possible to obtain better control over airplane pitch rate and normal acceleration responses. Improved control over the onset rate of these two system parameters is expected to provide a significant improvement in overall airplane tracking performance, and reduce the effects of wind gusts upon the aircraft. The control of the aircraft pitch rate serves to minimize the effects of atmospheric turbulence on precise manual aircraft aiming during ordnance delivery flight phases.

In the construction forms schematically illustrated in FIGS. 2 and 6, a suitable pilot input 21 as modified by a linear gradient and breakout element 32, is employed as the command signal to summing junction element 33. The subject invention is also generally applicable for direct lift command blending in situations wherein the comand signal is obtained from automatic rather than manual sources. Application of this alternate type include automatic landing systems and automated tracking systems such as integrated fire control/flight control systems. In such applications, the automatac command signal would be applied directly to the summing junction element 33 without use of the linear gradient and breakout element 32.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An aircraft flight control corcuit receiving a system command signal and generating direct lift and longitudinal command signals, said flight control circuit comprising:
    a direct lift command signal circuit receiving said system command signal and developing a direct lift command signal as a function thereof,
    subtraction means differencing said system command signal and said direct lift command signal to provide a longitudinal command signal,
    and a blending circuit, said blending circuit constraining said longitudinal comman signal as a function of said direct lift command signal.

2. An aircraft flight control circuit receiving a system command signal and generating direct lift and longitudinal command signals as described in claim 1 wherein said direct lift command signal circuit comprises:
    a blending integrator, generating automatic direct lift command signals during an initial system transient response to a pilot manual command signal,
    a first summing junction, said first summing junction generating an output signal by subtracting the output of said blending integrator from the pilot manual command signal,
    a recentering nonlinear element, receiving said output signal from said first summing junction and producing a recentering signal that produces differences in system sensitivity in said direct lift command signal circuit between conditions of large and small pilot manual command inputs,
    and a direct lift element, said direct lift element receiving said recentering signal produced by said recentering nonlinear element and generating the direct lift command signal.

3. An aircraft flight control circuit receiving a system command signal and generating direct lift and longitudinal command signals as described in claim 2 wherein said blending circuit comprises an interconnected gain circuit, said interconnected gain circuit receiving said direct lift command signal generated by said direct lift element and processing said direct lift command signal with a gain of less than unity to guicken the transient response.

4. An aircraft flight control circuit receiving a system command and generating direct lift and longitudinal command signals as described in claim 3 wherein said subtraction means comprises:
    second and third summing junction, said second summing junction producing a total system command signal by combining said automatic direct lift command signals, generated by said blending integrator, with said recentering signal produced by said recentering nonlinear element,
    said third summing junction generating the longitudinal command signal by subtracting said direct lift command signal, processed by said blending circuit, from said total system command signal produced by said second summing junction.

5. An aircraft flight control circuit receiving a system command and generating direct lift and longitudinal command signals as described in claim 4, including first and second air data gain circuits, said air data gain circuits modifying said aircraft flight control circuit for use with aircraft having pitch rate command flight control systems,
    said first air data gain receiving said system command signal and applying an air data gain equal to the airspeed velocity of the host aircraft to said system command signal, said first air data gain generating a normal acceleration command signal for input to said aircraft flight control circuit,
    said second air data gain receiving the output signal of said third summing junction in said subtraction means, said second air data gain applying a gain of inverse value of said airspeed velocity of said host aircraft, said second air data gain reconverting the output of said third summing junction to the proper value for pitch rate command flight control systems.

* * * * *